United States Patent [19]

Wiand et al.

[11] Patent Number: 4,741,219

[45] Date of Patent: May 3, 1988

[54] COUPLING FOR COUPLING A DRIVEN ELEMENT TO A DRIVING ELEMENT SAID ELEMENTS FOLLOWING DIFFERENT DISPLACEMENT TRAJECTORIES

[75] Inventors: Michel Wiand; Jean-Marie Jeuffray, both of Bressuire, France

[73] Assignee: Etablissements Farnier et Penin, Courbevoie, France

[21] Appl. No.: 9,496

[22] Filed: Feb. 2, 1987

[30] Foreign Application Priority Data

Feb. 7, 1986 [FR] France ................................ 86 01690

[51] Int. Cl.[4] ................................................ F16H 21/44

[52] U.S. Cl. ........................................... 74/104; 74/110

[58] Field of Search ...................... 74/89.2, 89.22, 104, 74/37, 89.21, 107, 566, 110

[56] References Cited

U.S. PATENT DOCUMENTS

| | | | |
|---|---|---|---|
| 746,158 | 12/1903 | Reed | 74/104 |
| 3,762,232 | 10/1973 | Muller | 74/89.22 |
| 3,862,579 | 1/1975 | Roberts | 74/89.2 |
| 4,198,871 | 4/1980 | Dunn et al. | 74/89.2 |
| 4,330,213 | 5/1982 | Kleinknecht et al. | 74/104 |
| 4,435,991 | 3/1984 | Hehl | 74/89.2 |

*Primary Examiner*—Lawrence Staab
*Attorney, Agent, or Firm*—Murray and Whisenhunt

[57] ABSTRACT

The coupling between a driving element (belt 1*a*) and a driven element (arm 7) is provided by a finger (6) sliding in an oblong opening (5*a*, 5*b*) through a coupling part (2) in the driving element, said sliding taking place both along the long axis of the oblong opening and perpendicularly thereto, parallel to the long axis of the finger.

4 Claims, 1 Drawing Sheet

COUPLING FOR COUPLING A DRIVEN ELEMENT TO A DRIVING ELEMENT SAID ELEMENTS FOLLOWING DIFFERENT DISPLACEMENT TRAJECTORIES

The present invention relates to a simple coupling for coupling a driving element such as a length of a belt or a cable, for example, and following a substantially rectilinear trajectory, to a driven element which is driven by the driving element along a trajectory which is similar but not parallel to the trajectory of the driving element, said trajectory of the driven element being defined by a fixed sideway or rolling path. As it moves, the driven element remains substantially parallel to itself, as does a swinging-sliding door, for example, i.e. a door for which an end portion of the closure movement or a beginning portion of the opening movement includes one or two components which are perpendicular to the main sliding direction.

BACKGROUND OF THE INVENTION

Numerous couplings exist for coupling a first member to a drive element while allowing the distance therebetween and/or their relative orientations to vary. Such couplings are often complex in structure, e.g. making use of telescopic and/or resiliently-deformable parts in order to allow for such variations, with the result that such parts are subjected to high stresses and to rapid wear.

The invention seeks to provide a simple coupling making use of a small number of parts and requiring minimal maintenance.

SUMMARY OF THE INVENTION

The present invention provides a coupling for coupling a driving element capable of performing rectilinear translation motion to a driven element which is guided parallel to itself along a trajectory which is close but not parallel to the direction in which the driving member moves, the coupling being constituted by a driving piece or core which is fixed to the driving element and which is provided with an oblong opening extending transversely to the direction of rectilinear motion, and by a connection finger which is fixed to the driven element and which is mounted in said opening so as to be capable of sliding therealong and also so as to be capable of sliding perpendicularly to the plane constituted by the long axis of the opening and the drive direction.

In a preferred embodiment, said driving core is constituted by a link member for linking together the two ends of a flexible strand which is thus looped by the link member, with the length of the looped strand which is fitted with said link member constituting said driving element.

When the above link is constituted by a belt, said core or link member is constituted by two plates which are clamped against each other in order to clamp to the ends of the belts while leaving a gap between the ends with the width of the gap being not less than the width of said opening.

Finally, coupling may include a resilient damping member disposed between the said core and a shoulder on said finger.

BRIEF DESCRIPTION OF THE DRAWING

An embodiment of the invention is described by way of example with reference to the accompanying drawing, in which.

DETAILED DESCRIPTION OF THE INVENTION

Figure 1:
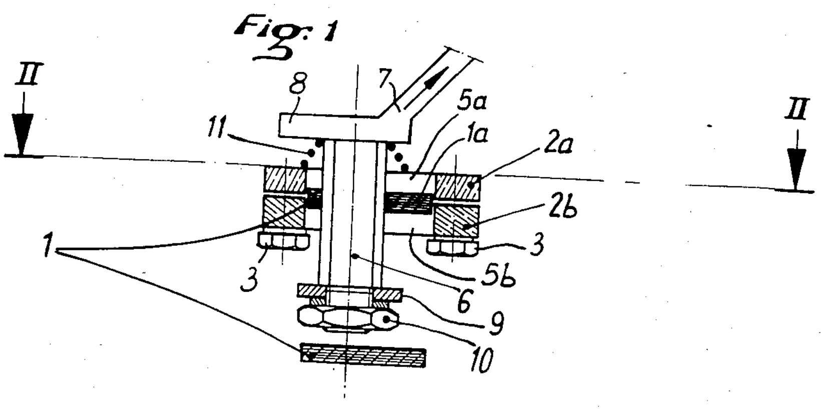
FIG. 1 is a cross-section through a coupling in accordance with the invention.
Figure 2:
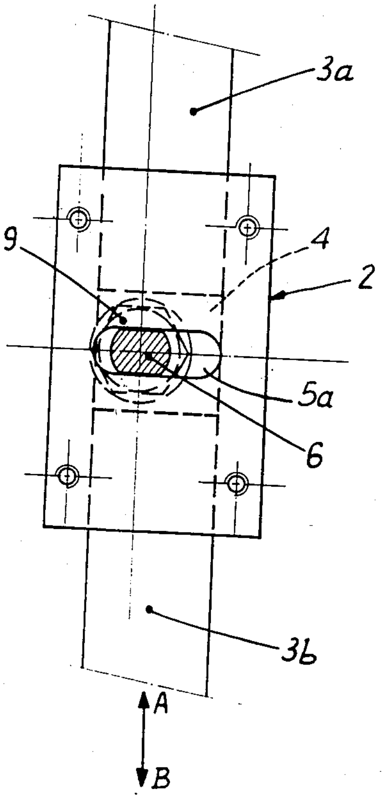
FIG. 2 is a section on a line II—II of FIG. 1.

These figures show a driving member in the form of a top length 1*a* of a flat belt 1 whose directions of displacement are indicated, in FIG. 2, by arrows A and B. This belt is coupled in conventional manner to a drive member, not shown, and is looped by means of a link part 2 constituted by two plates 2*a* and 2*b* which are assembled together by means of screws 3 which clamp the ends 3*a* and 3*b* of the belt 1 between the plates in order to form the above-mentioned length 1*a*. It may be seen in FIG. 2 that the ends 3*a* and 3*b* of the belt do not meet each other. A gap 4 is left between the ends for reasons explained below.

Each of the plates 2*a* and 2*b* is provided with an oblong opening 5*a* or 5*b* which extends transversely to the directions A–B along which the length 1*a* of belt is capable of moving, with said openings being vertically aligned.

A finger 6 is received through these openings and room is left in the gap 4 for housing the finger between the ends of the belt, both of which fall short of the openings 5*a* and 5*b*. The finger 6 is fixed to an arm 7 which is in turn fixedly coupled to a driven element, for example a swinging-sliding door which is guided by rails extending in a direction substantially parallel to the directions of belt displacement A and B, but which include end portions extending sideways and/or above or below said general direction. The finger 6 is provided with parallel flats for preventing it from rotating about its axis relative to the sides of the openings 5*a* and 5*b*. The length of the finger 6 is greater than the thickness of the two plates 2*a* and 2*b* clamped together by the screws 3, thereby leaving it free to slide parallel to its own axis relative to the openings. This sliding movement is limited by abutments constituted by a shoulder 8 where the finger 6 joins the arm 7 and by an end washer 9 which is fixed to the finger by means of a nut 10. In addition to this vertical sliding motion along the axis of the finger, the finger is also capable of sliding along the long direction of the oblong openings 5*a* and 5*b*, transversely to the directions of displacement A–B of the driving element. It can be seen that this assembly is capable of absorbing any relative movement of the arm 7 relative to the belt length 1*a* in a plane perpendicular to the drive direction, so long as the amplitude of said movement is limited by construction. Such a coupling thus provides the driven element with two degrees of freedom relative to the driving element, and is therefore entirely suitable for driving swinging-sliding doors of the type commonly found on public transportation vehicles.

A resilient member 11, shown in the form of a conical spring in the present example, constitutes a member for damping shocks and jolts which may occur when the drive motion is braked, or is started, or is stopped.

The invention is applicable to the field of mechanical construction.

We claim:

1. A device for coupling a belt driving element to a driven element which driven element is guided generally parallel to itself along a trajectory which is close but not parallel to the belt driving element comprising: a driving core which is fixed to the belt driving element; an oblong opening in said core which oblong opening extends transversely to the belt driving element and lies within the width of the belt driving element; and a connection finger which is fixed to the driven element and which is slidably mounted in said oblong opening; whereby the said finger is capable of moving both generally parallel to the belt driving element and capable of moving perpendicularly to the belt driving element.

2. A device according to claim 1, wherein said driving core comprises a link member for linking together the two ends of said belt driving element which belt driving element is thus looped by the link member.

3. A device according to claim 2, wherein said core comprises two plates which are clamped together so that the ends of the belt driving member are clamped therebetween while leaving a gap between the ends of the belt driving element, with the width of the gap being not less than the width of said oblong opening.

4. A device according to claim 1, including a resilient damping member disposed between the said core and a shoulder on said finger.

* * * * *